US012776221B2

(12) United States Patent
Litvins et al.

(10) Patent No.: US 12,776,221 B2
(45) Date of Patent: Oct. 27, 2026

(54) SYSTEM FOR DETERMINING THE POSITION OF AN AUTONOMOUS OR AUTOMATED AIRCRAFT DURING ITS APPROACH TO A LANDING SITE

(71) Applicant: Archer Aviation Inc., San Jose, CA (US)

(72) Inventors: Andrejs Litvins, Wessling (DE); Eduardo Martin, Wessling (DE)

(73) Assignee: Archer Aviation Inc., San Jose, CA (US)

(*) Notice: Subject to any disclaimer, the term of this patent is extended or adjusted under 35 U.S.C. 154(b) by 138 days.

(21) Appl. No.: 18/343,033

(22) Filed: Jun. 28, 2023

(65) Prior Publication Data

US 2024/0005804 A1 Jan. 4, 2024

(30) Foreign Application Priority Data

Jun. 30, 2022 (EP) .................................... 22182305

(51) Int. Cl.
*G05D 1/00* (2024.01)
*B64F 1/20* (2006.01)
(Continued)

(52) U.S. Cl.
CPC ................ *G08G 5/54* (2025.01); *B64F 1/20* (2013.01); *G08G 5/55* (2025.01); *G08G 5/57* (2025.01)

(58) Field of Classification Search
CPC ........................................................ G08G 5/54
See application file for complete search history.

(56) References Cited

U.S. PATENT DOCUMENTS 4,209,768 A 6/1980 Basov
4,251,806 A * 2/1981 McNaney ............. G09G 3/045 340/815.54

(Continued)

OTHER PUBLICATIONS

YouTube video clip entitled "How ILS Works I Instrument Landing System Explained I IFR Training, " 5 pages, uploaded on Sep. 7, 2021 by user "FlightInsight" [retrieved on Dec. 23, 2024]. Retrieved from the Internet: <https://www.youtube.com/watch?v=taqMkdXL3Xg&t=501s>. (Year: 2021).*

(Continued)

*Primary Examiner* — Ramon A. Mercado
*Assistant Examiner* — Paul W Arellano
(74) *Attorney, Agent, or Firm* — Finnegan, Henderson, Farabow, Garrett & Dunner, LLP

(57) ABSTRACT

A system for determining a position of an autonomous or automated aircraft during its approach to a landing site comprises: a ground-based visual landing aid having a radiating surface, which radiates light in the form of light cones arranged discretely in a two-dimensional grid, wherein a navigation light is formed by a plurality of adjacent light cones, the light cones forming the navigation light change depending on a deviation of the aircraft from a target landing path; and an aircraft-based digital receiver, which, during the landing, continuously detects the positions of the light cones forming the navigation light along the radiating surface and determines, on the basis of the detected positions, a state of the aircraft, wherein the system is configured to generate commands for autonomously landing the aircraft or for assisting a pilot in landing the aircraft on the landing site based on the determined state of the aircraft.

13 Claims, 9 Drawing Sheets

(51) Int. Cl.

| | |
|---|---|
| ***G08G 5/54*** | (2025.01) |
| ***G08G 5/55*** | (2025.01) |
| ***G08G 5/57*** | (2025.01) |

(56) References Cited

U.S. PATENT DOCUMENTS

| | | | | |
|---|---|---|---|---|
| 4,651,282 | A * | 3/1987 | Robinson | H03J 1/00 701/538 |
| 7,196,329 | B1 | 3/2007 | Wood et al. | |
| 7,216,069 | B2 | 5/2007 | Hett | |
| 10,713,958 | B2 | 7/2020 | Hobbs et al. | |
| 11,370,559 | B1 * | 6/2022 | Curlander | B64F 1/18 |
| 2006/0125658 | A1 | 6/2006 | Dohler et al. | |
| 2009/0055038 | A1 * | 2/2009 | Garrec | G01S 13/913 701/17 |
| 2016/0122038 | A1 | 5/2016 | Fleischman et al. | |
| 2017/0088288 | A1 | 3/2017 | Wang | |
| 2017/0170623 | A1 * | 6/2017 | Chen | G02F 1/37 |
| 2021/0209791 | A1 | 7/2021 | De Rijk et al. | |
| 2021/0240953 | A1 * | 8/2021 | Hullander | G06K 19/06112 |

OTHER PUBLICATIONS

European Search Report for European Application No. 22182305.7 dated Dec. 7, 2022, 8 pages.
European Communication for European Application No. 21197173.4 dated Nov. 21, 2023, 5 pages.
European Search Report for European Application No. 21197173.4 dated Feb. 23, 2022, 7 pages.

* cited by examiner

SYSTEM FOR DETERMINING THE POSITION OF AN AUTONOMOUS OR AUTOMATED AIRCRAFT DURING ITS APPROACH TO A LANDING SITE

PRIORITY CLAIM

This application claims the benefit of the filing date of European Patent Application Serial No. EP22182305.7, filed Jun. 30, 2022, for "SYSTEM FOR DETERMINING THE POSITION OF AN AUTONOMOUS OR AUTOMATED AIRCRAFT," the disclosure of which is hereby incorporated herein in its entirety by this reference.

TECHNICAL FIELD

The present disclosure relates to a system for determining the position of an autonomous or automated aircraft during its approach to a landing site. It also relates to a corresponding method for determining the position of an autonomous or automated aircraft during its approach to a landing site.

BACKGROUND

Here, in an automated aircraft, the pilot is assisted to varying degrees by the system and other devices, whereas an autonomous aircraft is configured to operate without a pilot on board.

There is currently no solution for autonomous or automated localization of an aircraft for landing in an Urban Air Mobility (UAM) setting. However, there are technical solutions in similar fields, such as the instrument landing system (ILS), the microwave landing system (MLS) or the ground based augmentation system (GBAS) in commercial aerospace or visual simultaneous localization and mapping (SLAM) techniques in the area of unmanned aerial vehicles (UAV). For UAV applications, it is furthermore known to use radio beacons.

Currently, guidance systems are used in commercial aircraft to warn the pilot when the aircraft deviates from its flight path. Guidance systems must maintain a certain level of accuracy, integrity, continuity, and availability during normal flight. Guidance systems used for landing have additional requirements for accuracy, integrity, continuity, and availability. Landing systems typically provide high-precision data on an aircraft's position and deviation from a target landing approach path. However, this high precision requires specialized equipment, which is expensive and is typically time-consuming in installation, calibration/certification, maintenance and repair.

Different types of approach indicators are currently being used to provide visual landing aid to an aircraft approaching a landing site. The most used is the Precision Approach Path Indicator (PAPI) system. It consists of four light units showing either red or white light through precision defined angles of approach. Each light unit is set to a different mid angle and below that angle shows red and above shows white. The overall effect is to give a reference to the median angle, which is set to the required glide path (usually 3°). The possible combination of the four light sets give five different indications relating to the aircraft position with respect to the required glide path: 1) four white lights: aircraft much too high; 2) three white lights and one red light: aircraft slightly too high; 3) two white lights and two red lights: aircraft on the correct glide path; 4) three red lights and one white light: aircraft slightly too low; 5) four red lights: aircraft much too low.

There is also a special system designed for heliport operations only—Helicopter Approach Path Indicator (HAPI) system. This system consists of a light box that emits four different patterns: 1) flashing green: helicopter above the optimal glide path (too high); 2) constant green: helicopter on the glide path; 3) constant red: helicopter slightly below the optimal glide path (slightly too low); 4) flashing red: helicopter below the optimal glide path (too low). The signal repetition of the flashing pattern must be greater than 2 Hz. In accordance with International Civil Aviation Organization (ICAO) recommendations, the HAPI system shall be capable of providing altitude adjustment at any desired angle between 1 and 12 degrees above the horizon with an accuracy of +/−5 minutes of arc. The angular size of the constant green light ("on glide path") is 45 minutes of arc.

If the heliport is situated in an area where obstacle clearance or noise procedures are prescribed or it is essential to fly a precisely defined track toward the Final Approach and Take-Off (FATO) area, a Visual Alignment Guidance System (VAGS) is used. The VAGS consists of two lights located symmetrically on both sides of a Touchdown and Lift-Off (TLOF) area. However, by way of light beam rotation, the pilot is presented with a sequenced display. When the helicopter is on the extended centerline of the TLOF area, or within 0.45° either side of the centerline, the pilot will see the two lights flashing simultaneously. If the helicopter is off the TLOF centerline by more than 0.45°, up to a maximum of 15°, the pilot will see a delay between the flashes. The two lights will flash with a variable delay (60 to 330 ms) according to the position of the helicopter relative to the centerline. The further the helicopter is from the centerline, the greater the delay. The delay between the two flashes produces a sequence effect, which shows the direction toward the TLOF centerline.

Current state of the art solutions enable determination of the aircraft's position in relationship to glide slope (PAPI/HAPI) and azimuth (VAGS), but their angular resolution is low and can be insufficient for electric Vertical Take-Off and Landing (eVTOL) aircraft in performing landings in highly complex landing environments such as urban environments.

Furthermore, a combined solution for determining the approach path in both planes (PAPI/HAPI and VAGS) requires the pilot to identify indications from each separate system and then estimate the spatial position of the aircraft based on the combination of these identified indications. This represents a tedious and error-prone task for a pilot, especially in the aforementioned critical urban landing zones that eVTOL aircraft must navigate.

Further, different types of Radio Frequency (RF) based landing systems such as Instrument Landing System (ILS) and Microwave Landing System (MLS) are commonly used. ILS uses RF signals for guidance: Very High Frequency (VHF) localizer signals for horizontal guidance and Ultra High Frequency (UHF) glideslope signals for vertical guidance. Separate ground infrastructure antennas are used for glideslope and localizer. The ILS system relies on emitting directional radio signals at different frequencies. The aircraft onboard equipment detects the signals from the ILS system and determines the signal strength emitted at different frequencies. In the case of glideslope, the directional RF signals are transmitted in the direction of the desired approach path at a set offset. While the signals are offset, there is an area where both signals overlap. When both signals are received at the same strength, this indicates that the aircraft is at the correct glideslope. As the aircraft moves father away from the optimal glideslope, one of the signals will become stronger than the other, which is then translated to a deviation angle and displayed on the aircraft instruments. The same is done for localizer signals.

MLS systems most commonly rely on Time Reference Scanning Beam (TRSB) principle of operation. MLS systems use an azimuth and elevation scanning antennas that scan through the coverage volume. In the case of the elevation antenna a full scan constitutes a scan downward through the coverage volume followed by a scan upward. The approaching aircraft therefore receives two RF pulses from the elevation antenna. The elevation of the aircraft can then be determined by recording the time between the two pulses (i.e., longer time represents higher elevation). The same principles apply to the azimuth antenna. Distance Measuring Equipment (DME) is used throughout the approach. A combination of these navigation sources enables the aircraft to determine its position and display the approach on its instruments.

Use of traditional RF systems requires a large area and complex and expensive ground infrastructure. Further RF based landing systems emit strong RF radiation, which make it impossible to incorporate in dense urban environments.

With this in mind, it is the object of the present disclosure to provide a system and a method for determining the position of an automated or autonomous aircraft during its approach to a landing site that is both simple and economical to implement and meets stringent aviation safety requirements, even in complex landing environments.

BRIEF SUMMARY

According to the present disclosure, this object is achieved by providing a system and a method as described herein.

More specifically, the present disclosure provides a system for determining the position of an autonomous or automated aircraft during its approach to a landing site, comprising:

i. a ground-based visual landing aid having a radiating surface, which radiates light in the form of light cones arranged discretely in a two-dimensional grid, wherein a navigation light is formed by a plurality of adjacent light cones, and the light cones forming the navigation light change in dependence on a deviation of the aircraft from a target landing approach path; and ii. an aircraft-based digital receiver, which, during the landing approach, continuously detects the positions of the light cones forming the navigation light along the radiating surface and determines, on the basis of the detected positions, a state of the aircraft.

Furthermore, the system is configured to generate commands for autonomously landing the aircraft or for assisting a pilot in landing the aircraft on the landing site based on the determined state of the aircraft.

Advantageously, the present disclosure allows abdicating the use of expensive and bulky RF components for approach guidance. In addition, the present disclosure does not rely on the use of the known low-resolution runway approach indicators (PAPI, HAPI, VAGS). Instead, the system according to the present disclosure uses an advanced digital concept for determining the approach path during landing. To this end, a ground-based visual landing aid provides digital signals in the form of light cones discretely arranged in a two-dimensional grid. The digital signals forming a navigation light are received and decoded by a suitable digital receiver in the aircraft, which determines the actual approach angles of the aircraft relative to the landing site based on these light cones. This approach enables landing navigation using instruments as in RF landing navigation systems combined with the technological simplicity, lower cost and lack of harmful radiation of light based navigation systems. The system according to the present disclosure also provides the ability to accurately and precisely (with scalable resolution) determine the position of the aircraft in two dimensions relative to the landing site.

In accordance with a preferred embodiment of the present disclosure, each light cone is generated by a separate light source, each light source emits light having a specific identification code, for each possible position of a light cone, the identification code of the light emitted by the corresponding light source is stored in a data memory of the aircraft-based digital receiver, and the aircraft-based digital receiver detects the positions of the light cones based on a detection of the identification codes of the lights emitted by the corresponding light sources.

For example, a localization method for an automated or autonomous aircraft may comprise the steps of: (i) acquiring images of an observation area in front of and or below the aircraft while the aircraft is approaching a given destination resulting in a time series of images, wherein a plurality of light sources are arranged in the observation area in a predetermined known spatial relationship to each other and to the destination, each light source intermittently emitting light in a predetermined known blinking pattern; (ii) recognizing and tracking light source objects throughout the time series; (iii) determining light source objects from among the recognized and tracked light source objects based on the known blinking patterns of the light sources; and (iv) determining a state of the aircraft with respect to the destination based on the light source objects thus determined.

The digital receiver in the approaching aircraft detects the lights emitted by the light sources (with the identification codes) to determine the positions of the current light cones along the radiating surface. The light sources thus fulfill a dual function. On the one hand, the light from a light source illuminates a specific light cone. On the other hand, this light has its own specific coding scheme to identify the light source and thus the position of the light cones.

Given the ground-based visual landing aid with the two-dimensional grid of the emitted light cones, the aircraft-based digital receiver only receives signals when the aircraft is flying within the range of these emitted light cones. In this way, a very efficient receiving method is created.

However, the emitted light cones can also have no coding at all or all the same coding. In this case, the position information about the detected light codes is obtained only on the basis of a digital analysis of the two-dimensional digital images acquired by the digital receiver.

In a further preferred embodiment, a pattern in which the light emitted by the light source is turned on and off represents the identification code of the light.

For example, when the aircraft is flying within the range of the light signals of the visual landing aid, the rate and/or delay with which a particular light signal is turned on and off provides a simple but effective way to encode position information with the light signal.

Alternatively, it may, however, preferably be provided that the wavelength of the light emitted by the light source represents the identification code of the light.

Accordingly, the light sources emit modulated light signals. This is achieved in a simple but effective way by using wavelength multiplexing (different wavelengths for each light source).

In accordance with a further embodiment of the system according to the present disclosure, light cones of the navigation light detected by the aircraft-based digital receiver are located at or near a center of the radiating surface when the aircraft is on the target landing approach path.

The position of the navigation light (which includes several adjacent light cones) in the center of the radiating surface provides an intuitive reference for the approach angles of the aircraft. In this central position of the navigation light, the aircraft's approach angles correspond to the target approach angles (measured from the horizontal and vertical).

In this context, it is further preferred that distances of the light cones of the navigation light detected by the aircraft-based digital receiver from the center of the radiating surface increase the further the aircraft deviates from the target landing approach path, and directions of displacement of the light cones of the navigation light detected by the aircraft-based digital receiver from the center of the radiating surface change according to a direction of deviation of the aircraft from the target landing approach path.

The two-dimensional, gridded display of the light system has the advantage of showing information not only about the amount of the deviation, but also about the direction of the deviation (i.e., both horizontally and vertically) of the aircraft from a predetermined optimal approach path, so that it is easy to derive the approach angles of the aircraft in both the horizontal and vertical planes from the position of the navigation light relative to the center.

BRIEF DESCRIPTION OF THE DRAWINGS

Further advantages and features of the present disclosure may be gathered from the subsequent description of a preferred, non-limiting embodiment of the present disclosure on the basis of schematic drawings, wherein.

DETAILED DESCRIPTION

Figure 1:
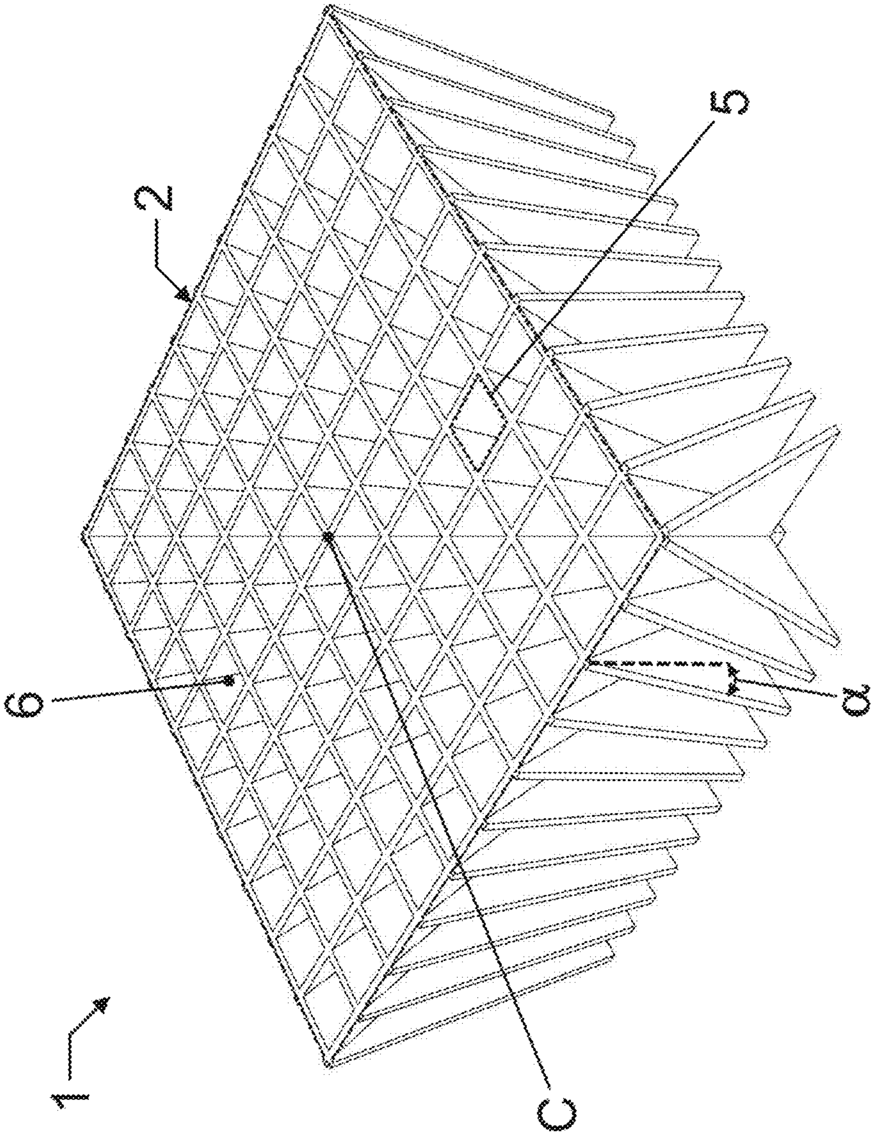
FIG. 1 is a three-dimensional perspective view of a visual landing aid for an autonomous or automated aircraft approaching a landing site according to a first embodiment of a system for determining the position of the aircraft during its approach to the landing site in accordance with the present disclosure.
Figure 2:
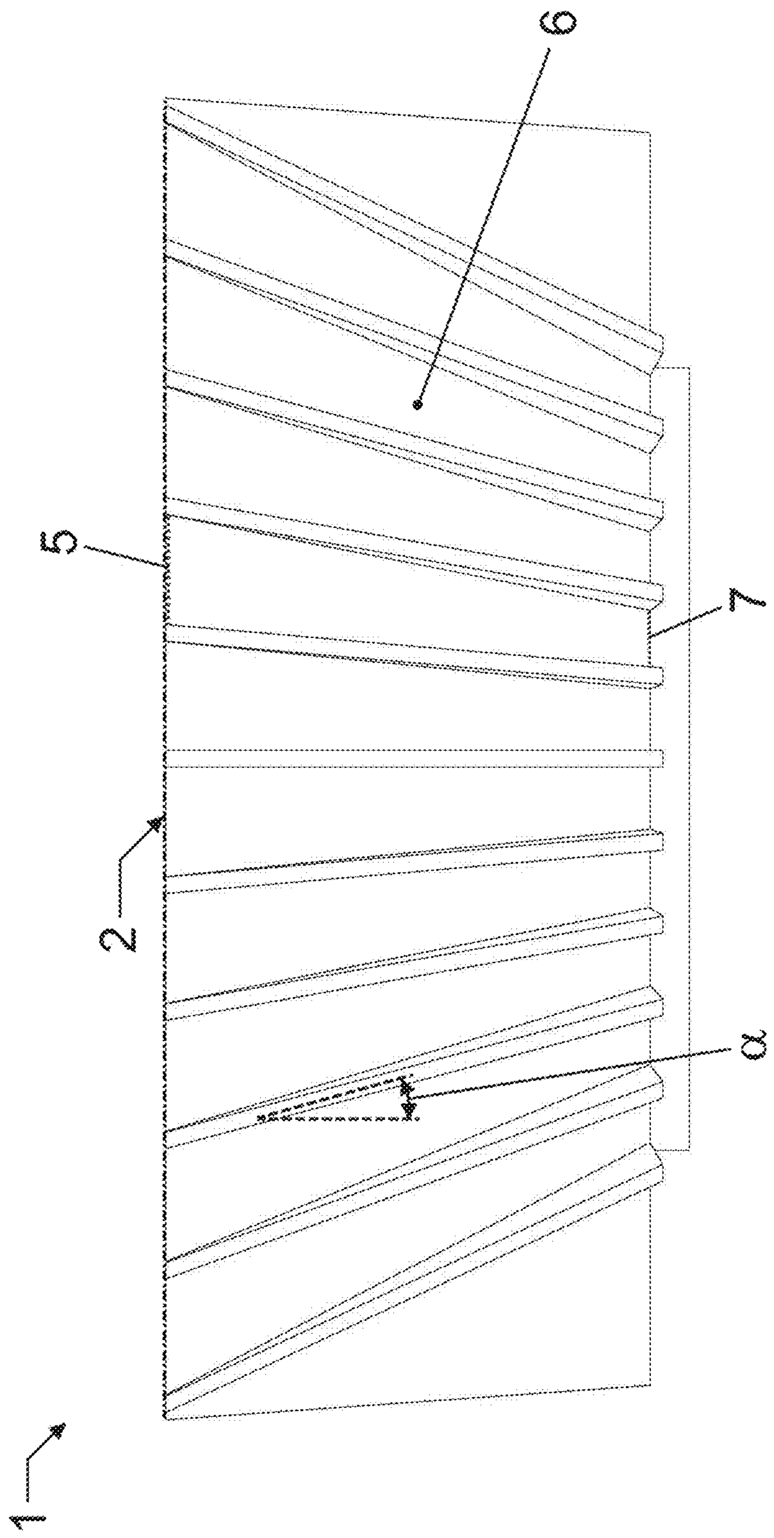
FIG. 2 is a side cross-sectional view of the visual landing aid shown in FIG. 1.

The present disclosure enables accurate determination of the landing approach path of an aircraft 8 by receiving light signals from a ground-based indicator system for landing navigation. This ground-based indicator system is a visual landing aid 1 comprising at least one light-emitting and/or light-reflecting element and a mechanical and/or optical structure for directing the light emitted and/or reflected by the element into a plurality of focused light cones 3, which are positioned next to each other in a grid-like manner along a radiating surface 2 of the structure and together form a navigation light 4, the focused light cones 3 forming the navigation light 4 changing for an observer in the aircraft 8 as a function of a deviation of the aircraft 8 from a target landing approach path.

According to the first embodiment illustrated in FIGS. 1 through 6, the radiating surface 2 is divided into a plurality of square openings 5 arranged in a grid-like (array-like) manner, forming rows and columns of openings 5, which are equidistantly spaced along the square radiating surface 2. FIGS. 3 through 6 are plan views of the radiating surface 2 from the perspective of an observer in the approaching aircraft 8. When viewed from this perspective, the openings 5 contain either a light cone 3 or no light cone 3, depending on the deviation of the aircraft 8 from a predetermined target landing approach path. Multiple adjacent light cones 3 together form a navigation light 4, the position of which along the radiating surface 2 provides a visual aid to landing navigation.

The approaching autonomous or automated aircraft 8 is equipped with an airborne digital receiver that continuously detects the current positions of the light cones 3 along the radiating surface 2 and uses these detected current positions of the light cones 3 to determine a state of the aircraft 8. The flight controller of the autonomous or automated aircraft 8 then generates commands for autonomously landing the aircraft 8 or for assisting a pilot in landing the aircraft 8 on the landing site L based on the determined state of the aircraft 8.

In particular, the determination of the state of the aircraft 8 may consist in the determination of the current approach angles of the aircraft 8 relative to the landing site L in both the vertical and horizontal planes. Such an advanced digital concept for determining the aircraft's deviation from a target landing approach path can be particularly advantageous in highly complex landing environments, such as urban environments, that must be managed now and in the future by electric Vertical Take-Off and Landing (eVTOL) aircraft 8 in the emerging Urban Air Mobility (UAM) market for air transportation of people and goods in cities and regions.

Figure 8:
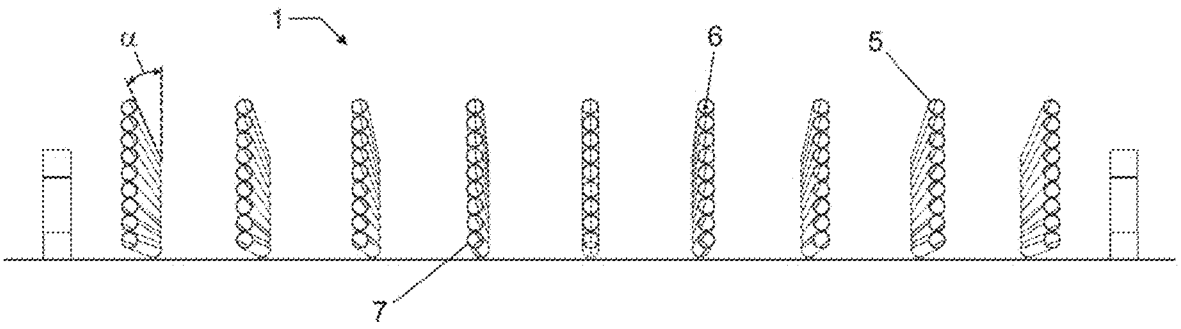
FIG. 8 is a front view of the visual landing aid shown in FIG. 7.
Figure 9:
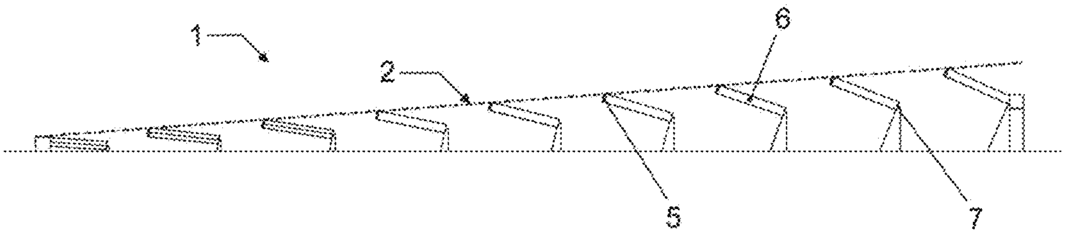
FIG. 9 is a side view of the visual landing aid shown in FIG. 7.
Figure 10:
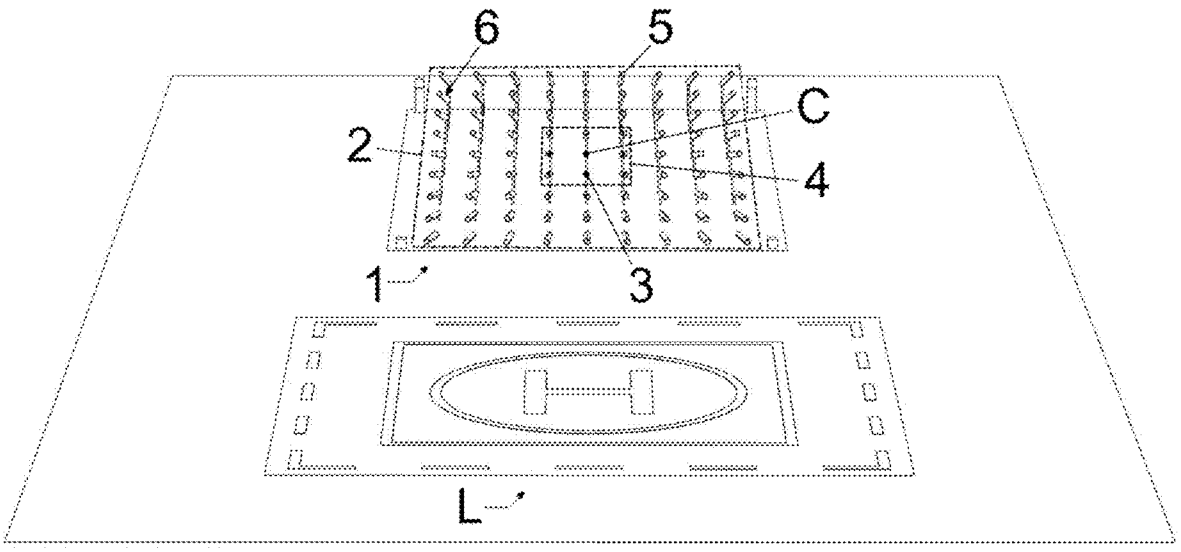
FIGS. 10 to 13 are plan views of the visual landing aid and the adjacent landing site, as shown in FIG. 7, wherein the positions of the visible cones fields along the radiating surface differ from each other depending on whether the aircraft is on the target approach path (FIG. 10) or deviates from that target approach path in different directions (FIGS. 11 to 13)

The present disclosure solves the problem of landing navigation in such complex environments by providing a grid (array) of illuminated openings 5. These openings 5 are each located at the end of a light-guiding channel 6. These light-guiding channels 6 have different inclinations $\alpha$ with respect to the radiating surface 2 and traverse an optical structure to each connect one specific light source (which couples its light into the light-guiding channel 6) to one specific opening 5 (see FIGS. 2, 8 and 9). Consequently, the openings 5 emit differently oriented narrow illumination cones from the radiating surface 2. Depending on the observer's viewing angle with respect to the visual landing aid 1, the differently oriented narrow illumination cones are either visible, so that a light cone 3 fills the respective opening 5 (completely or at least partially), or not visible, so that no light cone 3 appears in the respective opening 5.

Various means are conceivable to create such narrow cones of illumination with different inclinations α. Instead of an optical structure with separate, differently inclined light-guiding channels 6 as in the two embodiments shown, other optical, mechanical or opto-mechanical devices can also be used for this purpose.

Emitters with different wavelengths can be used as light sources, for example, emitters for light in the visible spectrum, in the infrared range, in the ultraviolet range or another selected range. It is also conceivable that the light sources, each associated with a particular light cone 3 along the radiating surface 2, emit light with at least two different wavelengths. Thus, the outer light cones 3 (which are further away from the center C of the radiating surface 2) can have a different color than the inner light cones 3 (which are closer to the center C of the radiating surface 2), e.g., to provide additional warning to the observer in the aircraft 8.

The light sources each generate a light cone 3 in the grid-like arrangement and emit light with a corresponding unique identification code for this light cone 3. The encoding of the light may be accomplished by repeatedly turning the light emitted by the respective light source on and off in a particular pattern, for example, at a particular delay and/or rate. Alternatively or additionally, such encoding may be performed by superimposing a specific wavelength and/or frequency on the emitted light signal. The aircraft-based digital receiver is equipped with a demodulator that can determine the identification codes of the lights belonging to the currently visible light cones 3. In a data memory of the aircraft-based digital receiver, a map is stored that associates to each possible position of a light cone 3 the identification code of the corresponding light emitted by the corresponding light source. Based on this map and the detected identification codes, the digital receiver is able to indirectly detect the positions of the currently activated light cones 3. Subsequently, these detected positions of the light cones 3 are used to compute the actual position of the aircraft 8 relative to the target landing approach path in a plane perpendicular to the path. This actual position of the aircraft 8 is given in terms of two approach angles (in both azimuth and elevation) relative to the landing site L.

In summary, depending on the actual approach angles of the aircraft 8, the digital receiver only receives signals from specific lights (with specific identification codes) from the visual landing aid 1. From the detected identification codes and thus from the detected positions of the light cones 3, the actual approach angles of the aircraft 8 can be determined in a technically very simple, but nevertheless very accurate way.

The direct relationship existing between the actual positions of the light cones 3 on the radiating surface 2, on the one hand, and the actual position of the aircraft 8 relative to the ground-based visual landing aid 1 and thus to the landing site L, on the other hand, is apparent from FIGS. 3 to 6.

Figure 3:
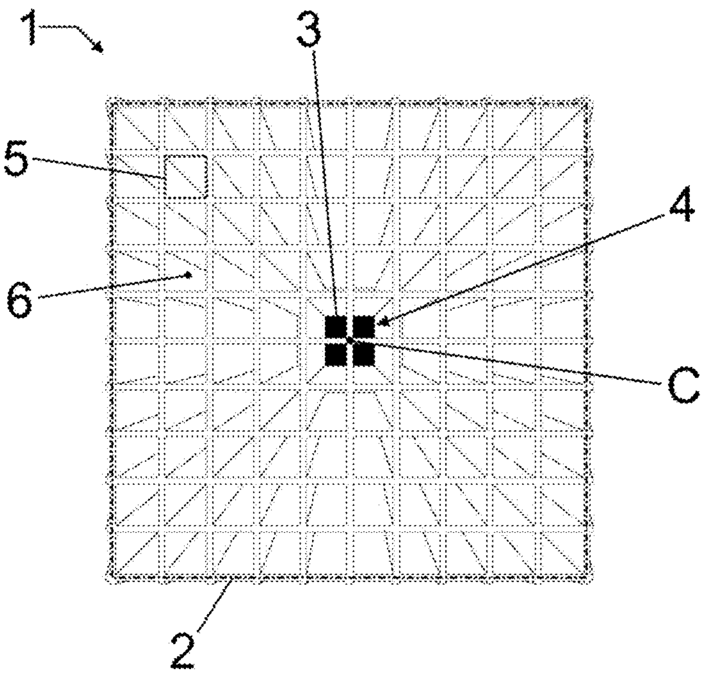
FIGS. 3 to 6 are plan views of a radiating surface of the visual landing aid shown in FIG. 1, wherein the positions of the visible cones fields along the radiating surface differ from each other depending on whether the aircraft is on the target approach path (FIG. 3) or deviates from that target approach path in different directions (FIGS. 4 to 6)
Figure 4:
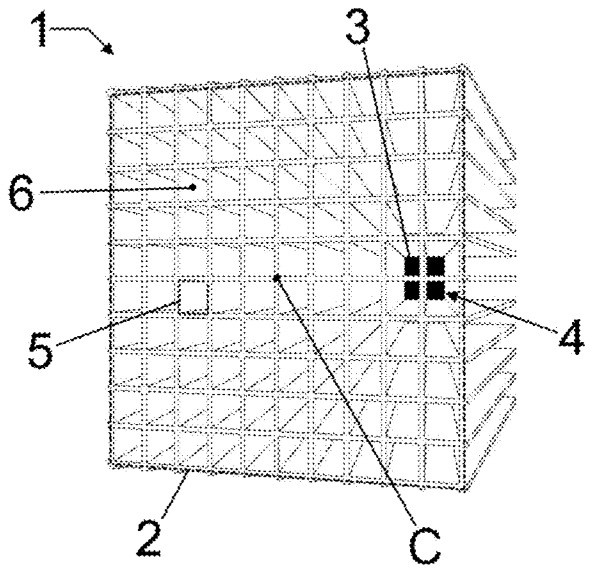
Figure 5:
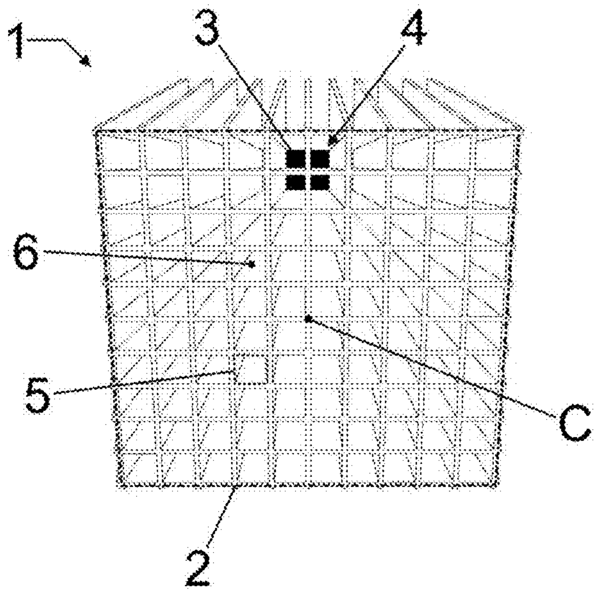
Figure 6:
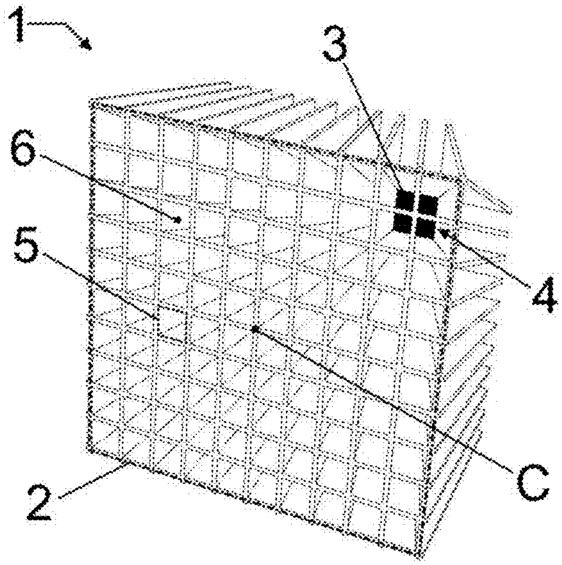
Figure 7:
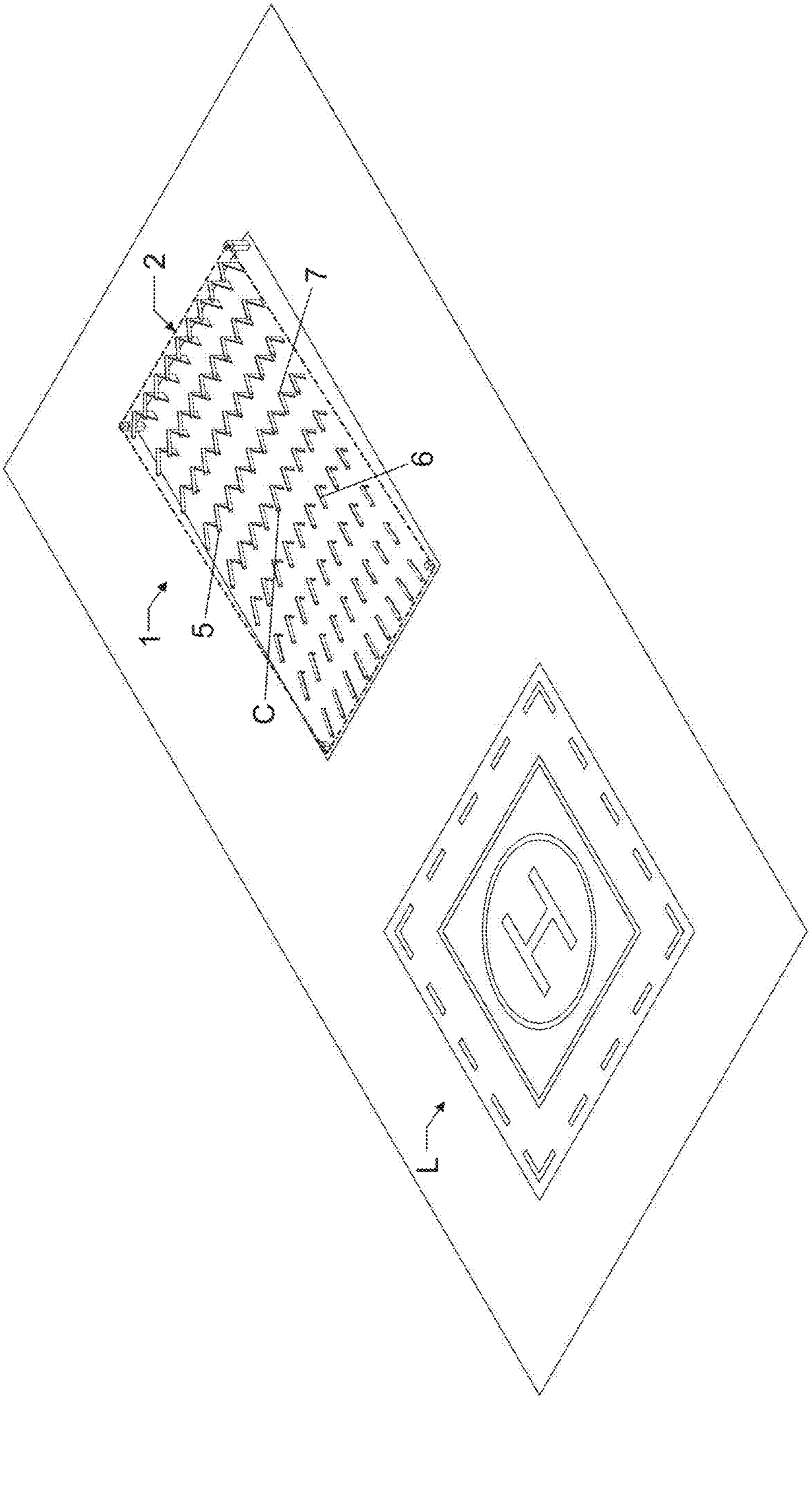
FIG. 7 is a three-dimensional perspective view of a visual landing aid for an autonomous or automated aircraft approaching a landing site according to a second embodiment, which is shown next to the landing site and is comprised in a system for determining the position of the aircraft during its approach to the landing site in accordance with the present disclosure.

The light cones 3 are arranged in a grid-like manner and positioned in such a way that the navigation light 4, which consists of several adjacent light cones 3, can be seen in the center C of the radiating surface 2 when the aircraft 8 is on the target landing approach path (see FIG. 3). However, the further the aircraft 8 moves away from the target landing approach path, the further the navigation light 4 (consisting of several adjacent light cones 3) also moves away from the center C of the radiating surface 2.

The accompanying drawings show an exemplary grid arrangement. In this example, a square grid of 10×10 openings 5 is provided along the radiating surface 2, with each opening 5 containing either one observable light cone 3 or no observable light cone 3, depending on the observer's angle of view during the landing approach. Only when the observer in the aircraft 8 is on the target landing approach path does the navigation light 4 appear in the center C of the radiating surface 2 (see FIG. 3). However, if the aircraft 8 is to the right of the target landing approach path, the observable navigation light 4 appears to the right of the radiating surface 2 (see FIG. 4), if the aircraft 8 is above the target landing approach path, the observable navigation light 4 appears at the top of the radiating surface 2 (see FIG. 5), if the aircraft 8 is both above and to the right of the target landing approach path, the observable navigation light 4 appears at the top right of the radiating surface 2 (see FIG. 6), and so on. Accordingly, the direction of deviation of the aircraft 8 from the target landing approach path corresponds to a direction of displacement of the navigation light 4 from the center C of the radiating surface 2.

FIGS. 7 to 13 show a second embodiment of the visual landing aid 1 in its potential practical installation as part of a landing infrastructure. To this end, the visual landing aid 1 is in a precisely calibrated installation position, with the center C of the radiating surface 2 lying on an extension of a central longitudinal axis of a landing site L for a VTOL aircraft 8.

This visual landing aid 1 of the second embodiment differs from that of the first embodiment only with respect to the configuration of the optical structure for generating the focused light cones 3. According to the second embodiment, the optical structure 3 comprises a plurality of light-guiding channels 6 in the form of tubes arranged in a grid-like manner with a plurality of equidistantly spaced rows R of the tubes. These tubes (light-guiding channels) 6 each have a first opening 7 into which light from a light-emitting and/or light-reflecting element (not shown) enters, and a second opening 5 from which light exits in the form of a focused light cone 3. The second openings 5 are distributed in a grid pattern along a radiating surface 2 of the optical structure, which is oblique to the horizontal installation surface. That is, within a row of the optical structure extending in a direction away from the landing site L, the distance from a second opening 5 of a tube (light-guiding channel) 6 to the horizontal installation surface increases continuously the farther the respective second opening 5 is from the landing site L (see FIGS. 8 and 9).

Figure 11:
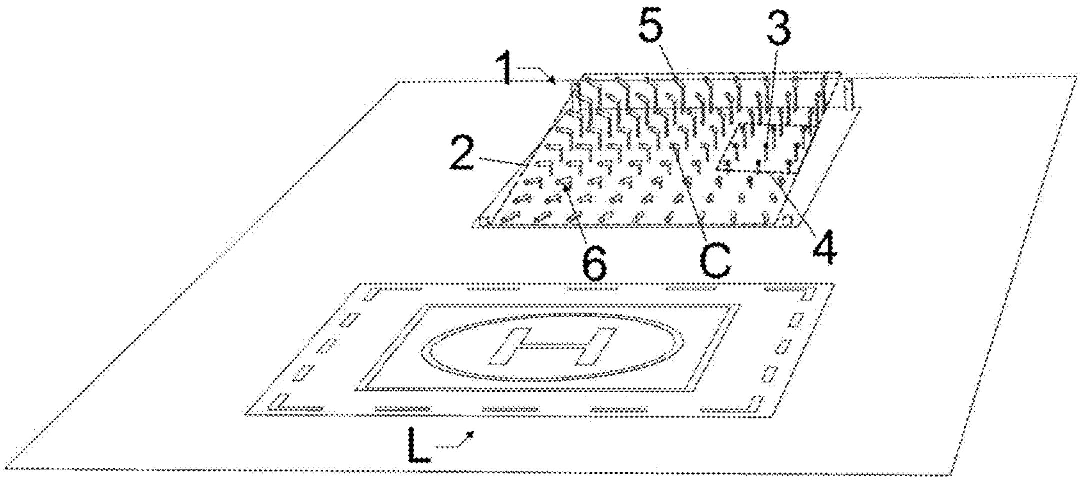
Figure 12:
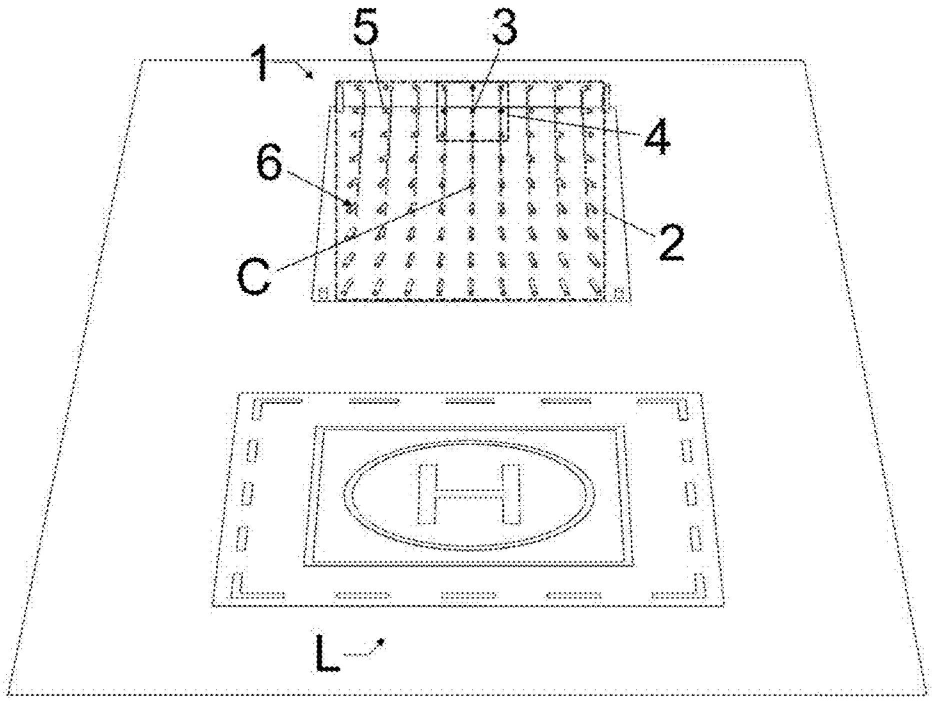
Figure 13:
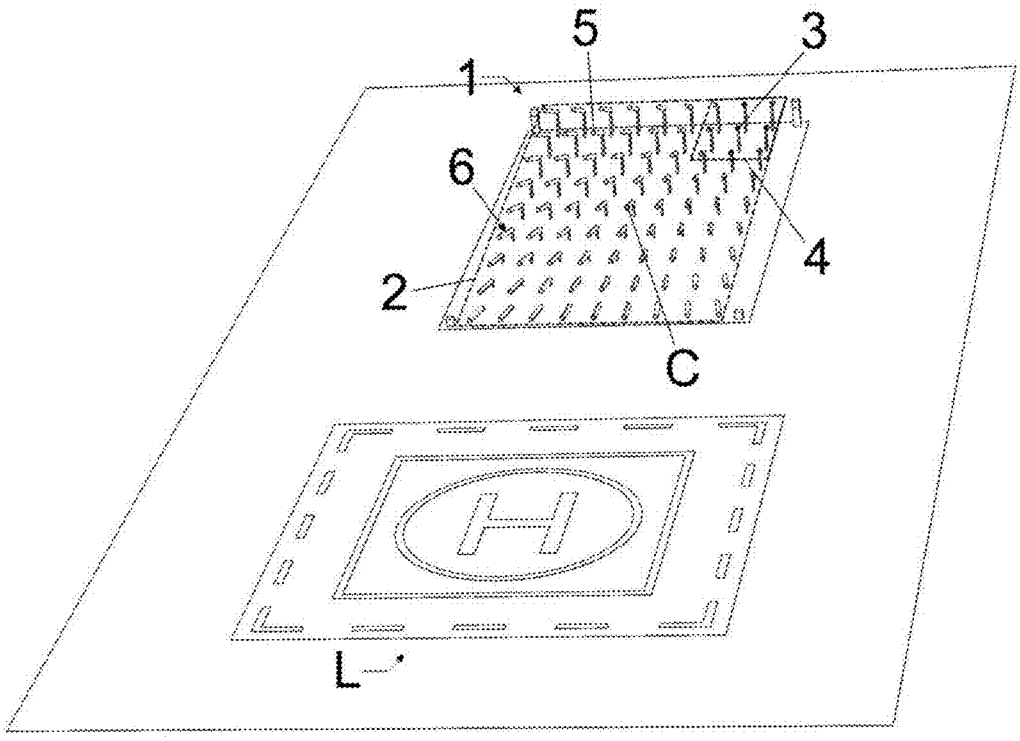

As in the first embodiment, depending on the approach path of the aircraft 8 relative to an optimal approach path (target landing approach path) to the landing site L, the navigation light 4, which is formed by a plurality of focused light cones 3 that are adjacent to each other and detectable to a digital receiver in the approaching aircraft 8, appears either around the center C of the radiating surface 2 (as in FIG. 10) or in a direction deviating from the center C of the radiating surface 2 in the same direction in which the aircraft 8 deviates from the optimal approach path (as in FIGS. 11 to 13).

That is, when the aircraft 8 approaching the landing site L is to the right of the target landing approach path (i.e., too far right), the navigation light 4 appears correspondingly in the middle right part of the radiating surface 2 of the optical structure (as shown in FIG. 11), when the aircraft 8 approaching the landing site L is above the target landing approach path (i.e., too high), the navigation light 4 appears correspondingly in the middle upper part of the radiating surface 2 of the optical structure (as shown in FIG. 12), when the aircraft 8 approaching the landing site L is both to the right of and above the target landing approach path (i.e., too far right and too high), the navigation light 4 appears correspondingly in the upper right corner part of the radiating surface 2 of the optical structure (as shown in FIG. 13), and so on . . . .

By continuously detecting the identification codes of the light cones 3 during the landing approach and comparing them with a pre-stored map linking each identification code to a corresponding position along the radiating surface 2, the positions of the light cones 3 forming the currently observed navigation light 4 can be determined. Based on these determined positions, the actual approach angles of the aircraft 8 with respect to the landing site L in both the vertical and horizontal planes can be determined in a simple, light-based manner without the need to use, for example, complex RF technology with increased radiation exposure.

The system proposed here provides a digital solution for determining an aircraft's (non)compliance with a specific landing approach path. However, it should be noted that the configuration illustrated in the drawings is only an example and can be adapted to better suit the specific landing approach scenario. In particular, different grid configurations, arrangements of lights, emitting frequencies, separation distances and illumination cones can be used to better meet specific landing approaches. For example, the higher the number of openings 5 and thus the number of possible light cones 3, the better the resolution of the system (i.e., the aircraft-based digital receiver can determine the approach angles even more accurately).

Figure 14:
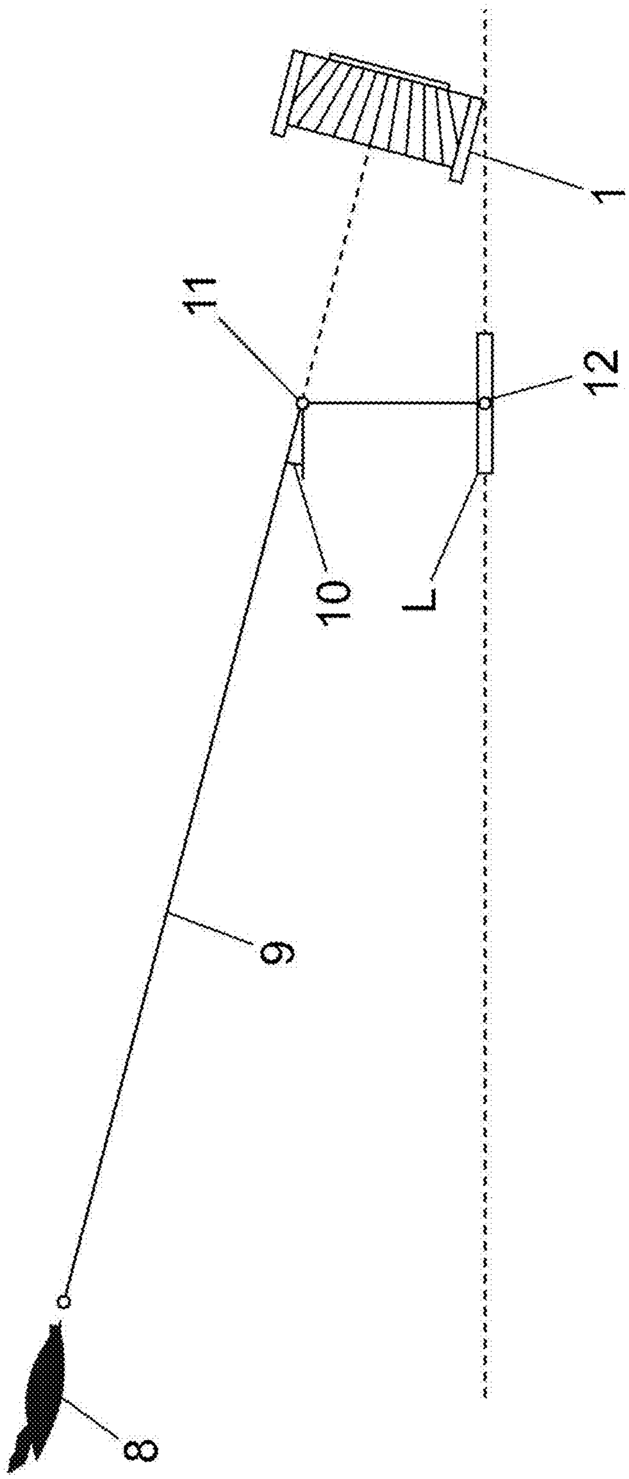
FIG. 14 is a schematic side view of an autonomous or automated VTOL aircraft descending to a landing site, adjacent to which is a visual landing aid according to the first embodiment of FIGS. 1 to 6.

FIG. 14 shows an example of a landing approach of a vertical take-off and landing (VTOL) aircraft 8 to a landing site L, wherein the system according to the present disclosure is used to determine the position of the VTOL aircraft 8 during this landing approach. Accordingly, a ground-based visual landing aid 1 is located in the vicinity of the landing site L, which in the example shown in FIG. 14 is configured according to the first embodiment of the visual landing aid 1 shown in FIGS. 1 to 6. Thus, the visual landing aid 1 has a radiating surface 2 that emits light in the form of light cones 3 discretely arranged in a two-dimensional grid, wherein a navigation light 4 is formed by a plurality of adjacent light cones 3, and the light cones 3 forming the navigation light 4 change depending on a deviation of the aircraft 8 from a target landing approach path (see FIGS. 3 to 6). The gradually increasing inclination angles $\alpha$ of this visual landing aid 1 (see FIG. 2) can reach values in the range between 0.5 degrees and 2.5 degrees. The size of the grid (number of light emitting openings in both directions) of the visual landing aid 1 can range from 7×7 to 12×12. The installation width of the visual landing aid 1 can be between 20 m and 30 m.

On the other hand, the VTOL aircraft 8 is equipped with a digital receiver that continuously detects the positions of the light cones 3 forming the navigation light 4 along the radiating surface 2 of the visual landing aid 1 during the landing approach along a descent path 9 and determines the actual approach angles of the VTOL aircraft 8 relative to the landing site L in both the vertical and horizontal planes based on the detected positions. In this way, the digital receiver in the VTOL aircraft 8 can determine the deviation of the actual descent path 9 of the aircraft 8 from a predetermined target landing approach path in both directions (horizontal and vertical).

In the example shown, the VTOL aircraft 8 approaches the landing site L along the descent path 9 that corresponds to the predetermined target landing approach path. Consequently, the descent angle 10 also corresponds to a target descent angle (target approach angle in the vertical direction). The mounting location of the visual landing aid 1 relative to the landing site L is calibrated so that the actual descent path 9, which corresponds to the target landing approach path, intersects with the center C of the radiating surface 2 of the visual landing aid 1.

In addition, the visual landing aid 1 is mounted at an angle to the ground so that the light cones 3 emerging from the openings 5 in and near the center C of the radiating surface 2 propagate along or near the descent path 9 corresponding to the target landing approach path. Therefore, as long as the aircraft 8 continues its descent along the descent path 9 shown, which corresponds to the target landing approach path, the digital receiver in the aircraft 8 continues to detect the navigation light 4 of the ground-based visual landing aid 1 in and around the center C of the radiating surface 2 (see FIG. 3).

When the VTOL aircraft 8 reaches a hover point 11 after completing the descent along the descent path 9, the VTOL aircraft 8 transitions from cruise flight to hover flight. The central landing point 12 of the landing surface L is vertically aligned with the hover point 11, so that the VTOL aircraft 8 lands centrally on the landing site L after completion of the hover flight phase.

The present disclosure enables precise approach angle determination for landing navigation using conventional digital receiver technology on the aircraft side and conventional lighting technology on the ground side. As a result, the purchase costs can be significantly reduced compared to the special equipment used in known approach guidance systems.

The technical advantages of the present disclosure also include higher position resolution in both the horizontal and vertical planes compared to existing runway approach path indicators (such as PAPI, HAPI and VAGS). Compared to RF-based landing navigation systems (such as MLS and ILS), the present disclosure requires comparatively smaller equipment and thus less installation space. In addition, the present disclosure allows the use of equipment that is less complex and therefore less expensive and does not emit potentially harmful radiation.

In conclusion, the present disclosure offers significant economic and technical advantages.

LIST OF REFERENCE SIGNS

1 visual landing aid
2 radiating surface
3 light cone
4 navigation light
5 (second) opening
6 light-guiding channel
7 (first) opening
8 VTOL aircraft
9 descent path
10 descent angle
11 hover point
12 landing point
C center of radiating surface
L landing site
$\alpha$ inclination

What is claimed is:

1. An aircraft landing system comprising:

a ground-based visual landing aid having a radiating surface configured to radiate light up through a plurality of adjacent light cones forming a navigation light observable from the aircraft, wherein the plurality of adjacent light cones forming the observable navigation light change based on a deviation of the aircraft from a target landing approach path; and an aircraft-based digital receiver configured to detect positions of the plurality of adjacent light cones forming the observable navigation light and determine, on a basis of the detected positions, a state of the aircraft, wherein:

the plurality of adjacent light cones are located at or near a center of the radiating surface when the aircraft is on the target landing approach path, and a distance of each of the plurality of adjacent light cones from the center of the radiating surface increases the further the aircraft deviates from the target landing approach path.

2. The aircraft landing system according to claim 1, wherein each of the plurality of adjacent light cones is generated by a separate light source having a specific identification code, and wherein the aircraft-based digital receiver is configured to detect the positions of the plurality of adjacent light cones based on a detection of the specific identification codes.

3. The aircraft landing system according to claim 2, wherein a pattern in which the light emitted by the separate light source is turned on and off represents the specific identification code of the light.

4. The aircraft landing system according to claim 2, wherein a wavelength of the light emitted by the separate light source represents the specific identification code of the light.

5. The aircraft landing system according to claim 1, wherein the aircraft-based digital receiver determines an actual approach angle of the aircraft based on the distance and a direction of displacement of each of the plurality of adjacent light cones from the center of the radiating surface.

6. The aircraft landing system according to claim 1, wherein the ground-based visual landing aid comprises an optical structure with a plurality of light-guiding channels each extending from a light source to an opening of a plurality of openings at the radiating surface.

7. The aircraft landing system according to claim 6, wherein the radiating surface is square in shape, and the plurality of openings are all an identical square shape and size forming an array pattern with rows and columns of the plurality of openings being equidistantly spaced along the radiating surface.

8. An aircraft landing method, comprising:

radiating light up through a plurality of adjacent light cones forming a navigation light observable from the aircraft, wherein the plurality of adjacent light cones forming the observable navigation light changes based on a deviation of the aircraft from a target landing approach path; and detecting positions of the plurality of adjacent light cones forming the observable navigation light by an aircraft-based digital receiver configured to determine, on a basis of the detected positions, a state of the aircraft, wherein:

the plurality of adjacent light cones are located at or near a center of the radiating surface when the aircraft is on the target landing approach path, and a distance of each of the plurality of adjacent light cones from the center of the radiating surface increases the further the aircraft deviates from the target landing approach path.

9. The aircraft landing system according to claim 1, wherein the location of the observable navigation light is configured to change in two dimensions.

10. The aircraft landing method of claim 8, wherein each of the plurality of adjacent light cones is generated by a separate light source having a specific identification code, and wherein the aircraft landing method further comprises detecting, by the aircraft-based digital receiver, the positions of the plurality of adjacent light cones based on a detection of the specific identification codes.

11. The aircraft landing method of claim 10, wherein a pattern in which the light emitted by the separate light source is turned on and off represents the specific identification code of the light.

12. The aircraft landing method of claim 10, wherein a wavelength of the light emitted by the separate light source represents the specific identification code of the light.

13. The aircraft landing method of claim 8, further comprising: determining, by the aircraft-based digital receiver, an actual approach angle of the aircraft based on the distance and a direction of displacement of each of the plurality of adjacent light cones from the center of the radiating surface.

* * * * *